(12) United States Patent
Hancock

(10) Patent No.: US 9,938,747 B2
(45) Date of Patent: Apr. 10, 2018

(54) METHOD OF MANUFACTURING FENCE WITH ELONGATED TUBULAR MEMBERS

(71) Applicant: Behlen Mfg. Co., Columbus, NE (US)

(72) Inventor: William H. Hancock, Columbus, NE (US)

(73) Assignee: Behlen Mfg. C0., Columbus, NE (US)

( * ) Notice: Subject to any disclaimer, the term of this patent is extended or adjusted under 35 U.S.C. 154(b) by 377 days.

(21) Appl. No.: 14/755,132

(22) Filed: Jun. 30, 2015

(65) Prior Publication Data

US 2016/0002950 A1   Jan. 7, 2016

Related U.S. Application Data

(60) Provisional application No. 62/021,445, filed on Jul. 7, 2014.

(51) Int. Cl.
*E04H 17/18* (2006.01)
*E04H 17/20* (2006.01)
(Continued)

(52) U.S. Cl.
CPC ............... *E04H 17/18* (2013.01); *A01K 3/00* (2013.01); *E04H 17/1417* (2013.01);
(Continued)

(58) Field of Classification Search
CPC ............ E04H 17/1417; E04H 17/1421; E04H 2017/1447; E04H 2017/1452; E04H 2017/1456; E04H 2017/146; E04H 2017/1465; E04H 2017/1473; E04H 2017/1478; E04H 17/18; E04H 17/24; Y10T 29/49966; Y10T 29/49968; Y10T 29/49934; Y10T 29/49945;
(Continued)

(56) References Cited

U.S. PATENT DOCUMENTS

| 1,441,724 A | * | 1/1923 | Ferris ................. E04H 17/1421 |
| | | | 119/502 |
| 5,312,089 A | * | 5/1994 | Venegas, Jr. .......... E04F 11/181 |
| | | | 256/19 |

(Continued)

*Primary Examiner* — Jermie Cozart
(74) *Attorney, Agent, or Firm* — Ryan T. Grace; Advent, LLP

(57) ABSTRACT

A fence includes first elongated tubular members, each one of which is configured to extend vertically from ends of the first elongated tubular members positionable proximate to a support surface (e.g., the ground). The fence also includes second elongated tubular members extending between the first elongated tubular members, each of which is configured to extend parallel to the support surface. The fence further includes receivers defined by apertures formed in the first elongated tubular members, each of which extends outwardly from respective first elongated tubular members so that each one of the second elongated tubular members can be fixedly attached to corresponding ones of the first elongated tubular members. In some embodiments, one or more of the first elongated tubular members and/or the second elongated tubular members can have a circular cross-section. The second elongated tubular members can be fixedly attached the first elongated tubular members with and/or without welding.

5 Claims, 4 Drawing Sheets

(51) Int. Cl.
*E04H 17/14* (2006.01)
*F16B 4/00* (2006.01)
*F16B 9/00* (2006.01)
*A01K 3/00* (2006.01)

(52) U.S. Cl.
CPC ......... *E04H 17/1421* (2013.01); *F16B 4/004* (2013.01); *F16B 9/00* (2013.01); *E04H 2017/1447* (2013.01); *E04H 2017/1452* (2013.01); *E04H 2017/1465* (2013.01); *E04H 2017/1478* (2013.01); *Y10T 29/49934* (2015.01); *Y10T 29/49945* (2015.01); *Y10T 29/49966* (2015.01); *Y10T 29/49968* (2015.01)

(58) Field of Classification Search
CPC ........ F16B 2012/403; F16B 9/00; F16B 5/08; F16B 4/004; F16D 1/068
See application file for complete search history.

(56) References Cited

U.S. PATENT DOCUMENTS

| | | | | |
|---|---|---|---|---|
| 2003/0030048 | A1* | 2/2003 | Quaintance | E04F 11/181 256/59 |
| 2004/0004211 | A1* | 1/2004 | McEnroe, Jr. | E04G 21/185 256/65.04 |
| 2005/0191121 | A1* | 9/2005 | Gasaway | E04F 11/181 403/263 |
| 2008/0029748 | A1* | 2/2008 | Ford | E04H 17/1413 256/65.03 |
| 2009/0032792 | A1* | 2/2009 | Ford | E04F 11/1834 256/67 |
| 2009/0278105 | A1* | 11/2009 | McIlwain | E04H 4/06 256/65.02 |

* cited by examiner

METHOD OF MANUFACTURING FENCE WITH ELONGATED TUBULAR MEMBERS

BACKGROUND

Generally, a fence is a structure designed to restrict or prevent movement across a boundary. For example, a corral (pen) can be an enclosure that holds livestock (e.g., one animal or many animals). Sections of fence can be used to form the outer perimeter of the enclosure. The corral can also include one or more gates, which can be used as a point or points of entry into the enclosure.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure relate to a fence. The fence can include first elongated tubular members, each one of which is configured to extend vertically from ends of the first elongated tubular members positionable proximate to a support surface (e.g., the ground). The fence can also include second elongated tubular members extending between the first elongated tubular members, each of which is configured to extend parallel to the support surface. The fence can further include receivers defined by apertures formed in the first elongated tubular members, each of which extends outwardly from respective first elongated tubular members so that each one of the second elongated tubular members can be fixedly attached to corresponding ones of the first elongated tubular members. In some embodiments, one or more of the first elongated tubular members and/or the second elongated tubular members can have a circular cross-section. The second elongated tubular members can be fixedly attached the first elongated tubular members with and/or without welding.

DRAWINGS

The Detailed Description is described with reference to the accompanying figures. The use of the same reference numbers in different instances in the description and the figures may indicate similar or identical items.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. The following detailed description is, therefore, not to be taken in a limiting sense.

Figure 1:
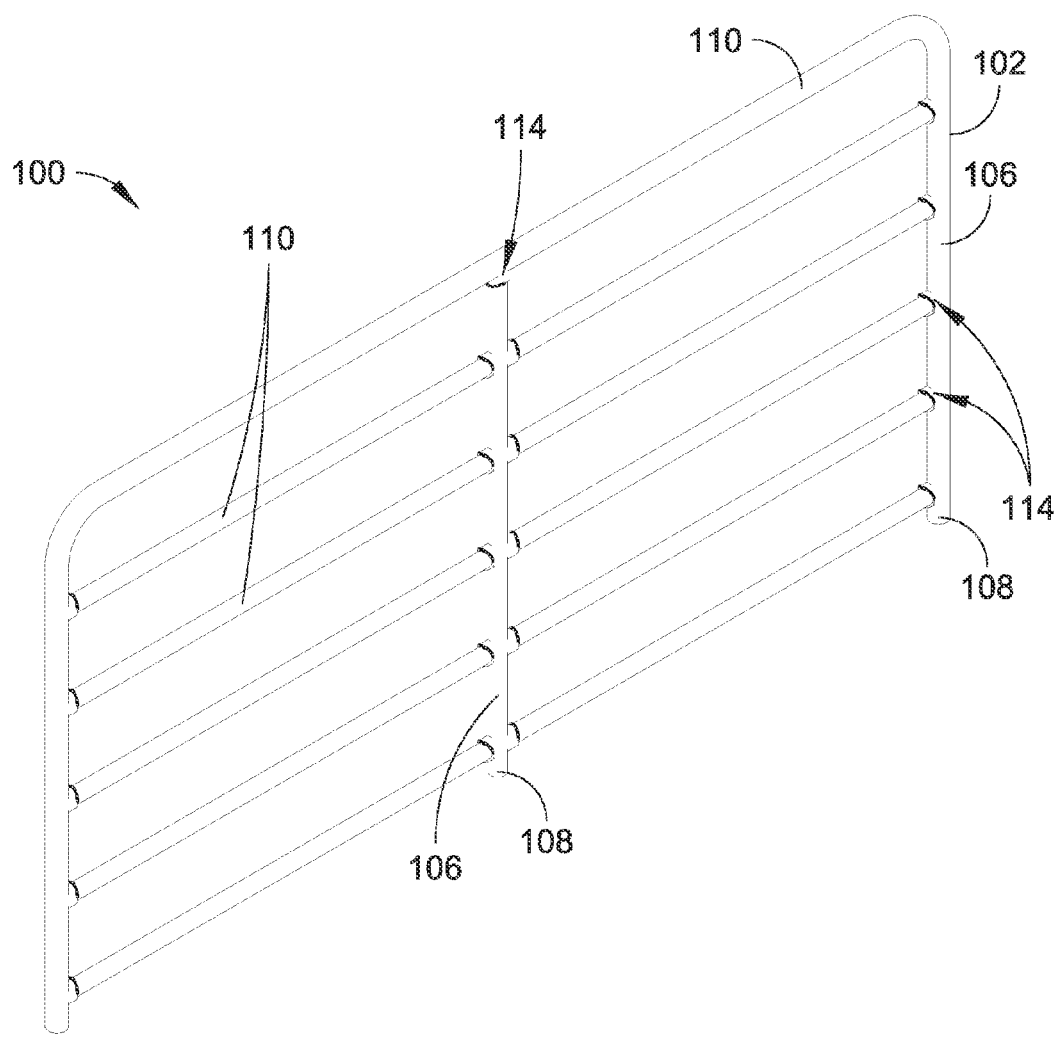
FIG. 1 is an isometric view illustrating a fence configured as a gate in accordance with an example embodiment of the present disclosure.
Figure 2:
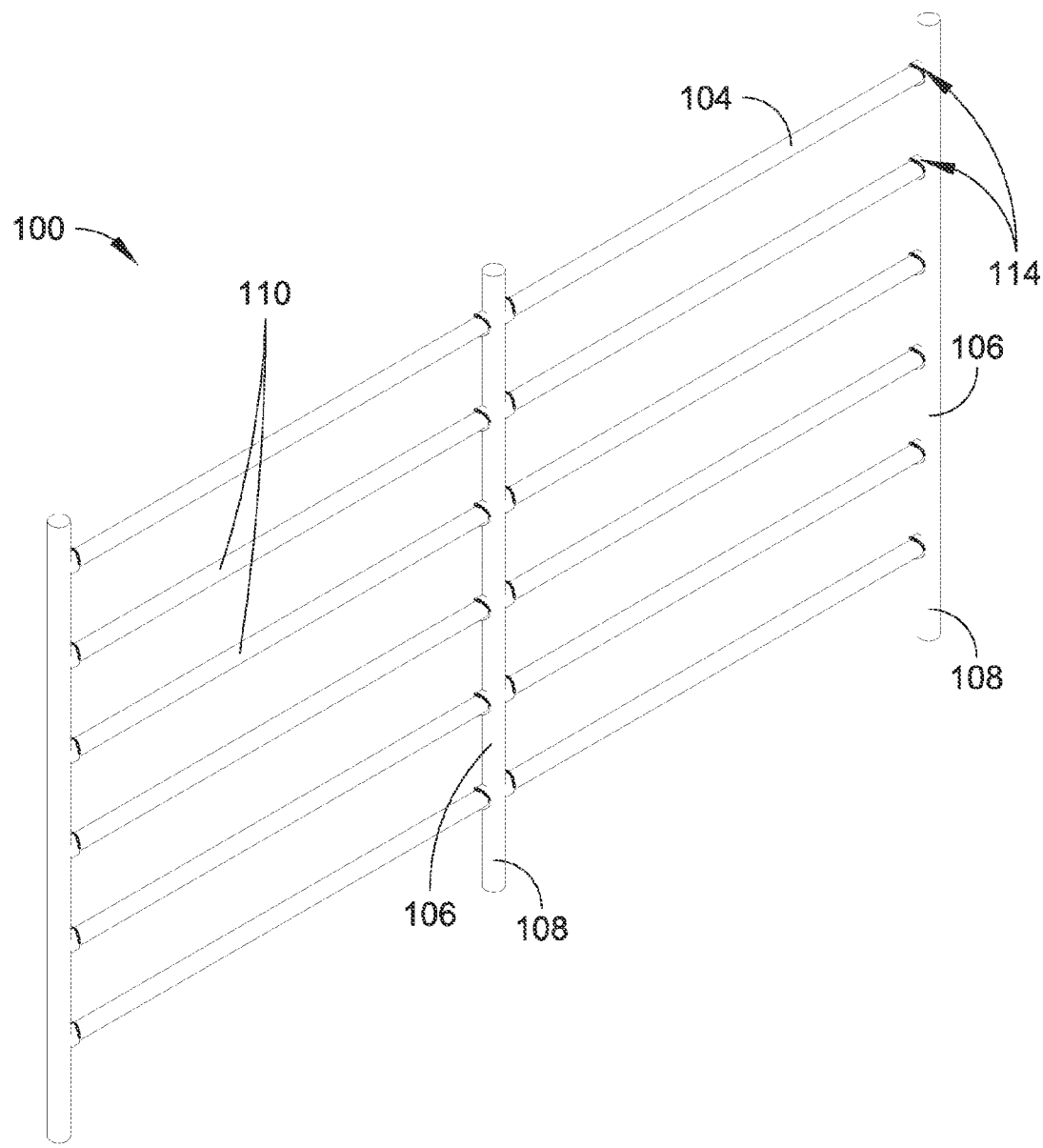
FIG. 2 is an isometric view illustrating a fence configured as a corral panel in accordance with an example embodiment of the present disclosure.
Figure 4:
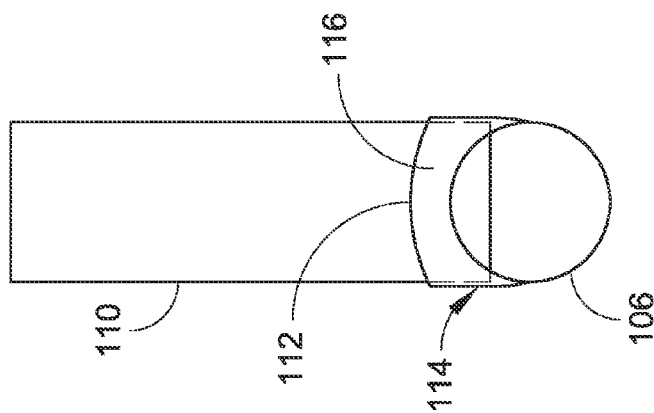
FIG. 4 is an end elevation view of the first and second tubes illustrated in FIG. 3.
Figure 3:
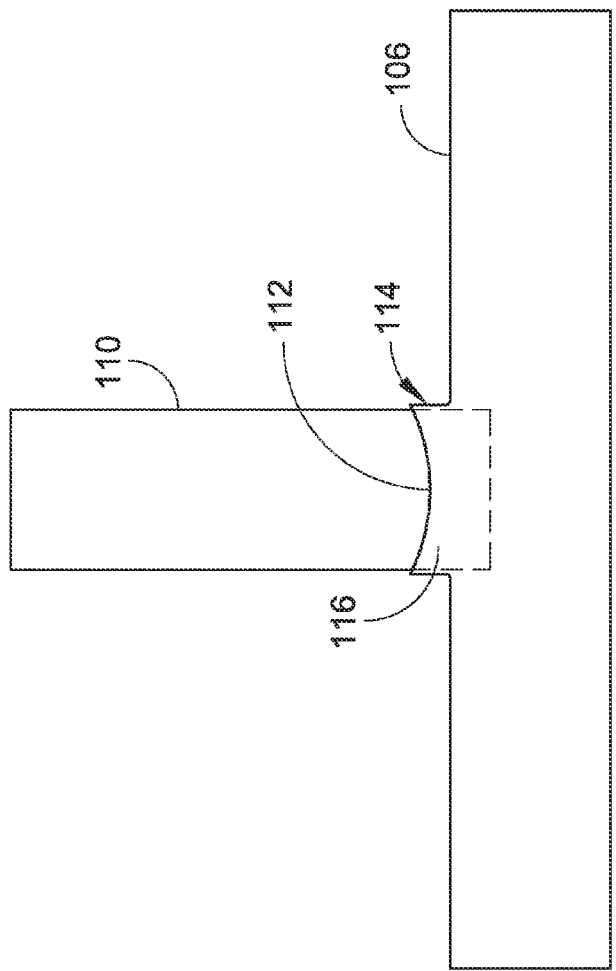
FIG. 3 is a side elevation view illustrating a first tube with an aperture formed therein, where the aperture defines a receiver for receiving a second tube in accordance with an example embodiment of the present disclosure.

Referring generally to FIGS. 1 through 4, a fence 100 is described. As shown in FIG. 1, the fence 100 can comprise a gate 102. As shown in FIG. 2, the fence 100 can comprise a corral panel 104. However, these particular fences or fencing sections are provided by way of example and are not meant to limit the present disclosure. In other embodiments, a fence 100 can be configured differently. For the purposes of the present disclosure, the term "fence" shall be understood to encompass a structure designed to restrict or prevent movement across a boundary. Thus, a fence 100 as described herein can also be implemented as a bale feeder, farm and/or ranch equipment, and so forth. The fence 100 includes elongated tubular members (e.g., posts 106), each one of which can extend vertically from an end 108 positioned proximate to a support surface, such as the ground. The fence 100 also includes additional elongated tubular members (e.g., rails 110), which extend between the posts 106 in orientations parallel to the support surface. In embodiments of the disclosure, one or more apertures 112 are formed in the posts 106, each of which defines a receiver 114. For example, a drill can be used to form an aperture 112 and an associated outwardly extending flange 116 in a post 106, where the post 106 and the flange 116 form a tee connection. The drill can have an expandable bit. One example drill with an expandable bit includes a T-drill. In operation, the bit can pierce an elongated member and expand within the elongated member. Upon retraction the expanded bit can manipulate the pierced edge outwardly to form the outwardly extending flange 116. However, a drilling operation is provided by way of example and is not meant to limit the present disclosure. In other embodiments, a receiver 114 can be formed using other equipment.

In some embodiments, a post 106 and/or a rail 110 have a circular cross-section. However, this cross-section is provided by way of example and is not meant to limit the present disclosure. In other embodiments, a post 106 and/or a rail 110 can have a different cross-section, including, but not necessarily limited to: a rectangular cross-section, a square cross-section, an elliptical cross-section, a hexagonal cross-section, an octagonal cross-section, and so forth. It should be noted that while the posts 106 and the rails 110 have been described with some specificity as vertically extending and horizontally extending, respectively; for the purposes of the present disclosure, the posts 106 and the rails 110 may be horizontally extending and vertically extending, respectively, and/or may be oriented differently (e.g., diagonally). For example, as shown in FIG. 1, a receiver 114 can be formed in a horizontally-oriented rail 110 (e.g., in the manner of the posts 106 previously described), and a vertically-oriented post 106 can extend from the rail 110 (e.g., in the manner of the rails 110 previously described).

The rails 110 can be fixedly attached to the posts 106. In some embodiments, the rails 110 can be welded to the posts 106 (e.g., using one or more wire welds, one or more resistance welds, and so forth). However, in other embodiments, the rails 110 can be fixedly connected to the posts 106 without welding. For example, a rail 110 can be connected to a post 106 using one or more adhesive materials (e.g., glue) applied between an end of a rail 110 and an interior surface of a receiver 114. Further, a rail 110 can be connected to a post 106 using a swaging operation (e.g., where dimensions of the rail 110 and/or the post 106 are altered using one or more dies into which the tubes are forced) and/or manipulation of an inside tube. For example, swaging can be used to deform an end of a rail 110 and a surface of a receiver 114 to connect the rail 110 to the receiver 114. In other embodiments, the end of a rail 110 and/or a surface of a receiver 114 can be mechanically manipulated (e.g., crushed) to connect the rail 110 to the receiver 114.

In some embodiments, a rail 110 can be riveted to a post 106. Further, a rail 110 can be screwed to a post 106 (e.g., using one or more sheet metal screws, self-tapping screws, and so on). Additionally, a rail 110 can be bolted to a post 106 (e.g., through one or more holes drilled into a rail 110 and a receiver 114). However, it should be noted that these connection techniques are provided by way of example and are not meant to limit the present disclosure. In other embodiments, different techniques and/or equipment can be used to fixedly connect a rail 110 to a post 106. For example, a rail 110 can be brazed to a post 106, connected to a post 106 using induction heating and/or fusion, soldered to a post 106, and so forth.

Figure 5:
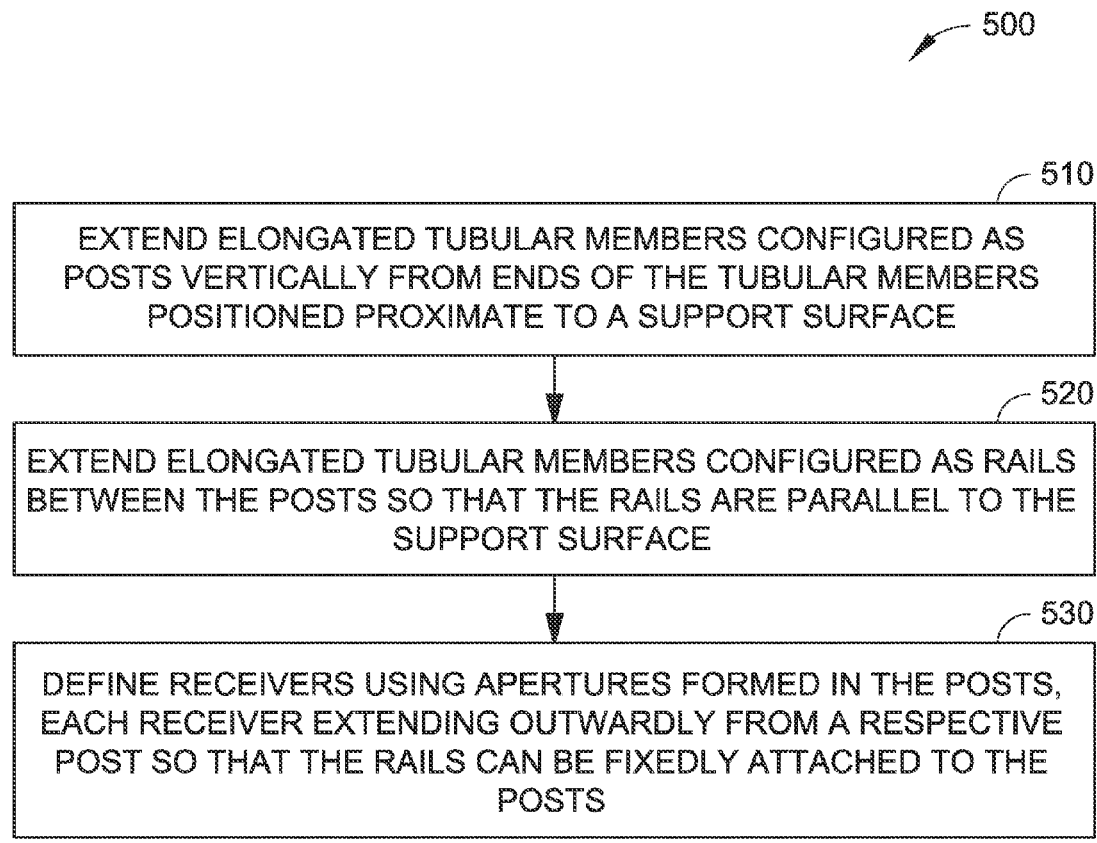
FIG. 5 is a flow diagram illustrating a method for establishing a connection between a first tube and a second tube in accordance with example embodiments of the present disclosure.

Referring now to FIG. 5, a procedure 500 is described in an example embodiment in which a connection can be established between a first tube and a second tube. At block 510, elongated tubular members configured as posts, such as posts 106, can be extended vertically from ends of the tubular members, such as ends 108, positioned proximate to a support surface, such as the ground. At block 520, elongated tubular members configured as rails, such as rails 110, can be extended between the posts so that the rails are parallel to the support surface. At block 530, receivers, such as receivers 114, are defined using apertures, such as apertures 112, formed in the posts, where each receiver extends outwardly from a respective post so that the rails can be fixedly attached to the posts. In one aspect, apertures 112 and outwardly extending flange 116 are formed using a drill with an expandable bit. In operation, the expandable bit of the drill pierces an elongated member and expands within the elongated member. Upon retraction, the expanded bit can manipulate the pierced edge outwardly to form the outwardly extending flange 116.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for manufacturing a gate or coral panel, the method comprising:
    providing a first plurality of elongated tubular members, wherein the first plurality of elongated tubular members are configured to extend generally vertically with respect to a support surface;
    providing a second plurality of elongated tubular members;
    forming a plurality of receivers in the first plurality of elongated tubular members, wherein forming the plurality of receivers comprises:
        forming apertures in the first plurality of elongated tubular members with a drill having an expandable bit, and
        retracting the expandable bit of the drill from the apertures to manipulate a pierced edge of the apertures outwardly to form outwardly extending flanges;
    performing a swaging operation to deform ends of the second plurality of elongated tubular members; and
    connecting the second plurality of elongated tubular members to the first plurality of elongated tubular members via the receiver by mechanically manipulation so that the second plurality of elongated tubular members are generally perpendicular to the first plurality of elongated tubular members.

2. The method as recited in claim 1, wherein the second plurality of elongated tubular members are not connected to the first plurality of elongated tubular members via welding.

3. The method as recited in claim 1, wherein at least one of the second plurality of elongated tubular members is further secured to at least one of the first plurality of elongated tubular members via riveting, screwing, bolting, brazening, fusing or welding.

4. The method as recited in claim 1, wherein at least one of the second plurality of elongated tubular members is further secured to at least one of the first plurality of elongated tubular members via glue.

5. The method as recited in claim 1, wherein each one of the first and second plurality of elongated tubular members has a circular cross-section.

* * * * *